(12) United States Patent
Miyasaka et al.

(10) Patent No.: US 8,599,228 B2
(45) Date of Patent: Dec. 3, 2013

(54) IMAGE PROCESSING APPARATUS, DISPLAY APPARATUS, AND IMAGE DISPLAYING SYSTEM

(75) Inventors: Daigo Miyasaka, Tokyo (JP); Masao Imai, Tokyo (JP); Fujio Okumura, Tokyo (JP)

(73) Assignee: NEC Corporation, Tokyo (JP)

( * ) Notice: Subject to any disclaimer, the term of this patent is extended or adjusted under 35 U.S.C. 154(b) by 795 days.

(21) Appl. No.: 12/373,943

(22) PCT Filed: Jul. 17, 2007

(86) PCT No.: PCT/JP2007/064096
§ 371 (c)(1),
(2), (4) Date: Jan. 15, 2009

(87) PCT Pub. No.: WO2008/015905
PCT Pub. Date: Feb. 7, 2008

(65) Prior Publication Data
US 2009/0262127 A1    Oct. 22, 2009

(30) Foreign Application Priority Data

Aug. 2, 2006 (JP) ................................. 2006-211169

(51) Int. Cl.
*G09G 5/10* (2006.01)
(52) U.S. Cl.
USPC ........................................................ 345/691
(58) Field of Classification Search
None
See application file for complete search history.

(56) References Cited

U.S. PATENT DOCUMENTS

| 6,529,209 | B1 * | 3/2003 | Dunn et al. | 345/629 |
| 7,978,929 | B2 * | 7/2011 | Kim et al. | 382/284 |
| 2005/0259089 | A1 * | 11/2005 | Yamazaki et al. | 345/204 |
| 2006/0221067 | A1 * | 10/2006 | Kim et al. | 345/204 |

FOREIGN PATENT DOCUMENTS

| JP | 63-312788 | 12/1988 |
| JP | 6-110403 | 4/1994 |
| JP | 6-186506 | 7/1994 |
| JP | 7-219489 | 8/1995 |
| JP | 2001-255844 | 9/2001 |

* cited by examiner

*Primary Examiner* — William Boddie
*Assistant Examiner* — Towfiq Elahi
(74) *Attorney, Agent, or Firm* — Young & Thompson

(57) ABSTRACT

An image processing apparatus, a display apparatus and an image displaying system wherein both secure and public images can be efficiently displayed with high quality without lowering the contrast of the public images. There are included a memory (101) that stores the image data of input secure and reversed images; a data assigning circuit (102) that assigns a pulse train, which has the same pulse width for the secure images and reversed images stored in the memory (101), as an image signal consisting of a pulse train to be used for displaying images on a display apparatus of PWM drive mode in which one frame is divided into a plurality of subfields to express brightness gray scales; and a shutter spectacle control signal generating circuit (103) that outputs a shutter control signal only during outputting of image signals in accordance with the secure images. The secure and reversed images have such a relationship that they become image data of images having no correlation with the secure images when the brightness values of their respective image data are added together for each pixel.

37 Claims, 14 Drawing Sheets

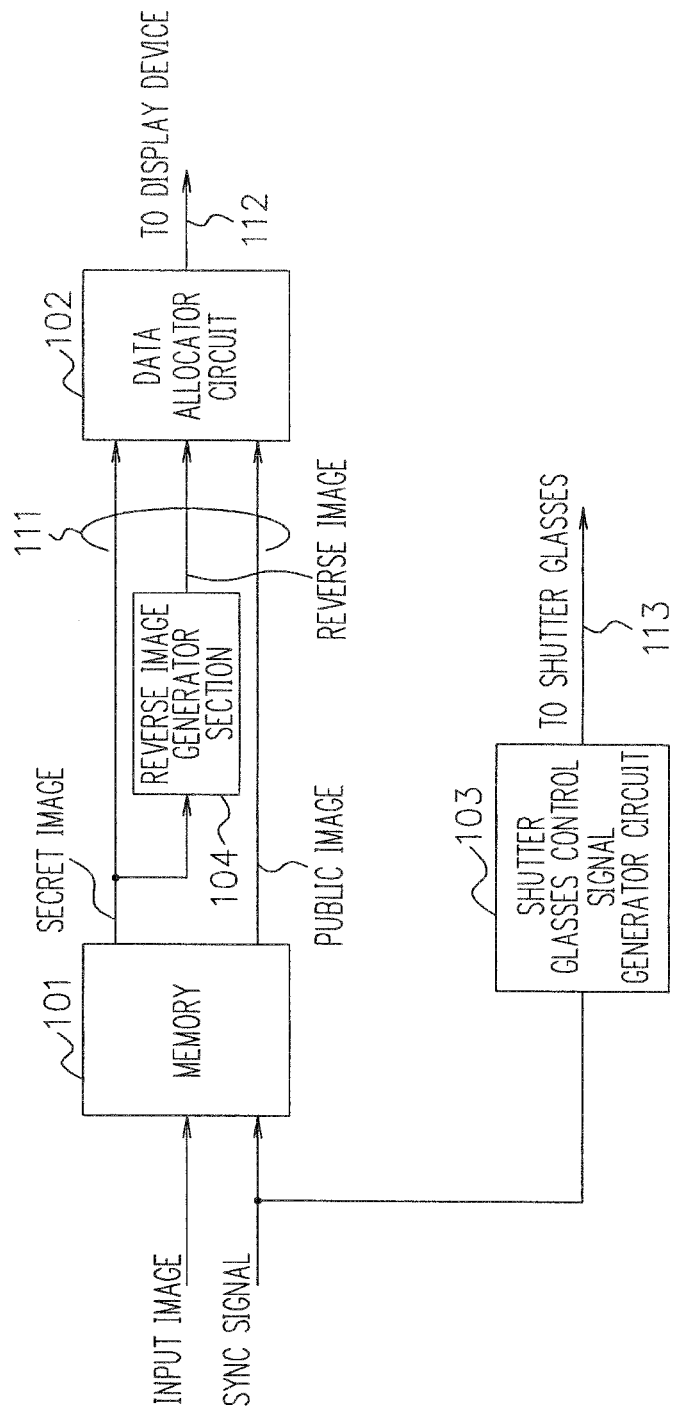
F I G. 9

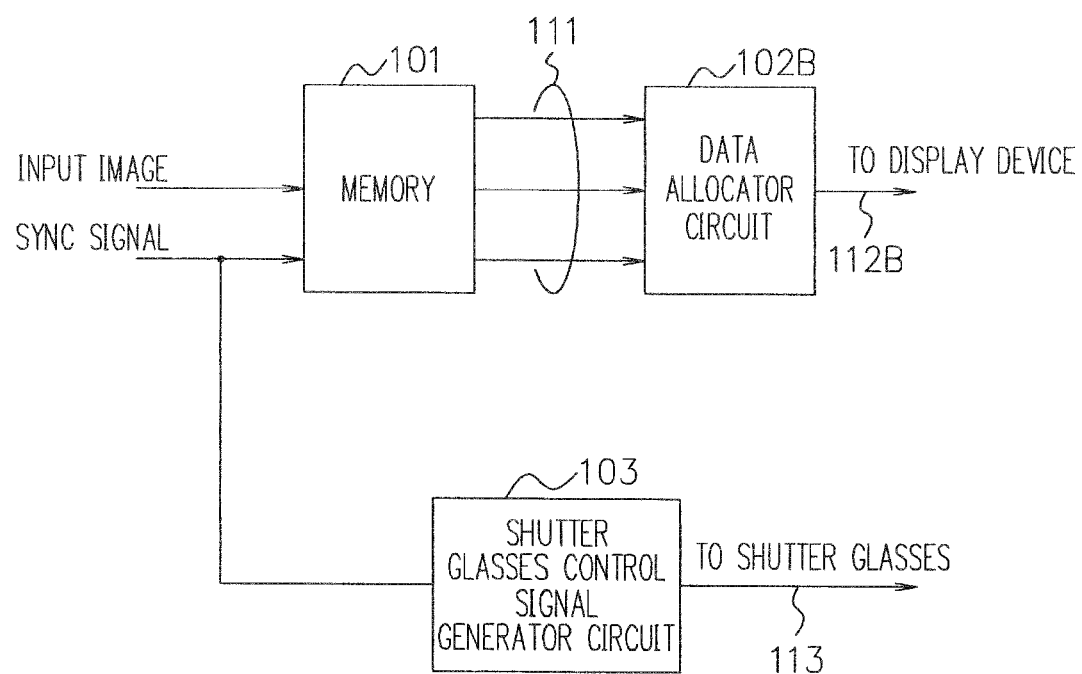
F I G. 12

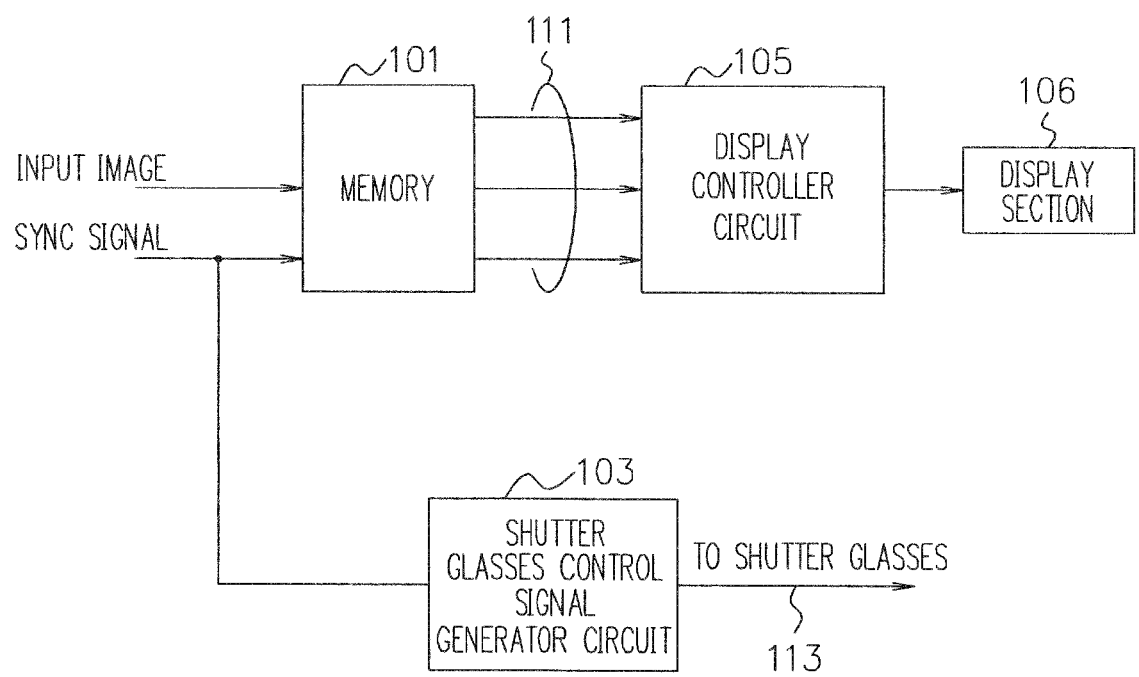
F I G. 14

IMAGE PROCESSING APPARATUS, DISPLAY APPARATUS, AND IMAGE DISPLAYING SYSTEM

TECHNICAL FIELD

The present invention relates to an image processor and a display device, and in particular, to a device and a system for presenting, to a particular user and an authenticated person, the contents thereof.

RELATED ART

A flat panel display such as a liquid-crystal display or a plasma display is broadly employed in mobile devices such as a mobile phone terminal and large-sized devices such as a public display placed in a street. To develop most of such displays, great stress has been placed on points such as a wide viewing angle, high brightness, and high picture quality; it has been required to display a fine image to be easily viewed from any angle.

On the other hand, some contents displayed on the display include contents such as secret information and private data which are desired to be kept secret. Hence, in the present in which the ubiquitous environment is growing in association with the progress of information apparatuses, it is an important problem that the user keeps the displayed contents secret from the other persons even in a public environment in which unidentified persons exist.

In addition, even in an office, the user handles, in some cases, secret information desired to be kept secret from those who pass behind the user.

Some mobile phone terminals include a display in which by arranging an optical shielding plate (louver) so that the displayed contents are visible only from a particular direction. However, a person just behind the user can steal a glance at the displayed contents; hence, this is not sufficient from a point of view of security.

The related arts to solve these problems include an "image display device" disclosed by Patent Document 1. This image display device is a device employing a pair of glasses including an image selecting function such that the device presents a particular image (to be referred to as a secret image hereinbelow) visible only the person (user) who wears the glasses and other images (to be referred to as a public image hereinbelow) to the other persons.

Specifically, an image display device shown in FIG. 1 stores one frame of an input image signal 11 in an image information storage memory 12 according to a frame signal 13. Thereafter, the device reads out image information from the memory 12 at a speed which is twice the frame period (i.e., two readouts during one frame); the first readout signal is compressed to half the original volume to be inputted as a first image signal 14 to a mixing circuit 15; the readout image signal is converted chroma and luminance and inputted as a second image signal 17 to the mixing circuit 15. Therefore, the first and second signals 14 and 17 are alternately displayed on an image display module 18.

On the other hand, the frame signal 13 is inputted also to a glasses shutter timing generator circuit 19. The generator circuit 19 drives a shutter of a pair of glasses 21 to control the glasses shutter to keep the image of the second image signal 17 masking from the user.

Due to the configuration and operation above, the persons who does not wear the glasses 21 views a gray image or a third image (public image) which is a mixed image of the first and second image signals 14 and 17 and which is not related to the first image signal 14, and the person who wears the glasses 21 views a desired image (secret image) of the first image signal 14.

Additionally, as another related art to resolve the above problem, there is a "method of providing data which can be privately viewed by use of a display available for the public" disclosed by Patent Document 2. According to the method disclosed by Patent Document 2, only an authorized user can decode a private image (secrete image) on the display, and an unauthorized user can view only a public image which is an image including a random pattern, a pattern not to be easily recognized, or a screen saver image.

To promote the object, in accordance with the invention disclosed by Patent Document 2, an image processing scheme including a data conceal pattern and an alternating pattern is synchronized with a display in which an image produced by the image processing technique is incorporated (for example, a wearable display of active glasses). Finally, an ability to provide data which can be privately viewed by use of a display available for the public is achieved by "a known ability to merge unlike images into a single image" of the human visual system.

Patent Document 1: Japanese Patent Laid-Open Publication Ser. No. Sho 63-312788
Patent Document 2: Japanese Patent Laid-Open Publication Ser. No. 2001-255844

DISCLOSURE OF THE INVENTION

Problem to be Solved by the Invention

However, according to the inventions disclosed by Patent Documents 1 and 2, the degree of freedom of the public image is not high and the image presentable as the public image results in an image not particularly meaningful such as a gray and flat image or a random pattern. Even if it is desired to present a meaningful image as the public image, the image results in low-contrast due to superimposing of gray and hence black level become poor to deteriorate the picture quality.

Moreover, since the public image cannot be displayed during the display period of the secret image, the public image is lowered in brightness as compared with the case of the ordinary use, and the light utilization efficiency is lowered.

Furthermore, in an operation to drive the glasses shutter at timing synchronized with the display period of the secret image, if there is disposed, to make only the secret image securely visible, a (blanking) period in which the image display is not conducted when the shutter is responding, the light utilization efficiency is further lowered.

The present invention is devised in consideration of the problem and an exemplary object of the invention is to provide an image processor, a display device, and an image display system capable of efficiently displaying a secret image and a public image of high picture quality without lowering contrast of the public image.

Means for Solving the Problem

To achieve the exemplary object, an image processor according to a first exemplary aspect of the present invention is an image processor for sequentially outputting image signals respectively corresponding to at least two kinds of images including: a memory for storing therein image data respectively of the at least two kinds of images inputted thereto, a first image and a second image being included in the at least the two kinds of images having a relationship in which when luminance values of the image data respectively thereof are added to each other for each pixel, resultant image data is image data of an image not having a correlation with the first image; data allocator means for allocating, as an image signal including a sequence of pulses for displaying an image corresponding to image data on a display device of PWM drive scheme which expresses luminance grayscale by subdividing one frame into a plurality of subfields, a sequence of pulses having one and the same pulse width to the image data of the first image and the image data of the second image stored in the memory; and shutter control means for outputting a shutter control signal only during a period in which the image signal corresponding to the first image is outputted.

Furthermore, to achieve the exemplary object, an image processor according to a second exemplary aspect of the present invention is an image processor for sequentially outputting image signals respectively corresponding to at least two kinds of images including: a memory for storing therein image data respectively of the at least two kinds of images inputted thereto; generating means for generating, on the basis of image data of a first image included in the at least two kinds of images and stored in the memory, image data of a second image having a relationship in which when luminance values of the image data are added to each other for each pixel, resultant image data is image data of an image not having a correlation with the first image; data allocator means for allocating, as an image signal including a sequence of pulses for displaying an image on a display device of PWM drive scheme which expresses luminance grayscale by subdividing one frame into a plurality of subfields, a sequence of pulses having one and the same pulse width to the image data of the first image and the image data of the second image; and shutter control means for outputting a shutter control signal only during a period in which the image signal corresponding to the first image is outputted.

In the first or second exemplary aspect of the present invention, it is favorable that the data allocator means allocates data such that the image signal corresponding to the first image is not adjacent in time to the image signal corresponding to the second image.

In either one of the configurations above of the first or second exemplary aspect of the present invention, it is favorable that the at least two kinds of images include a third image and the data allocator means allocates a sequence of pulses having an arbitrary pulse width to image data of the third image and outputs an image signal corresponding to the third image during a period in which the shutter control signal is not outputted.

Moreover, to achieve the exemplary object, an image processor according to a third exemplary aspect of the present invention is an image processor for sequentially outputting image signals respectively corresponding to three kinds of images including a first image, a second image, and a third image, including: a memory for storing therein image data respectively of the three kinds of images inputted thereto, the first image and the second image having a relationship in which when luminance values of image data respectively thereof are added to each other for each pixel, resultant image data is image data of an image not having a correlation with the first image; generating means for generating, on the basis of the image data of the second image and the image data of the third image which are stored in the memory, image data of a composite image thereof; data allocator means for allocating, as an image signal including a sequence of pulses for displaying an image on a display device of PWM drive scheme which expresses luminance grayscale by subdividing one frame into a plurality of subfields, a sequence of pulses having a pulse width to the image data of the composite image, the pulse width being equal to a pulse width of the image data of the first image; and shutter control means for outputting a shutter control signal only during a period in which the image signal corresponding to the first image is outputted.

In the third exemplary aspect of the present invention, it is favorable that the data allocator means allocates data such that pulses which are included in the sequence of pulses of the image signal corresponding to the composite image and which have a pulse width equal to the pulse width of the image signal of the first image are not adjacent in time to the image signal corresponding to the first image.

In either one of the above configurations of the first, second, or third exemplary aspect of the present invention, it is favorable that the data allocator means allocates a blanking period as a period at least before or after the period in which the image signal corresponding to the first image is outputted.

In either one of the above configurations of the first, second, or third exemplary aspect of the present invention, it is favorable that an image obtained by adding luminance values of the image data respectively of the first and second images to each other for each pixel is a gray, flat image.

Also, to achieve the above exemplary object, a display device according to a fourth exemplary aspect of the present invention is a display device for sequentially displaying at least two kinds of images in a PWM drive scheme which expresses luminance grayscale by subdividing one frame into a plurality of subfields, including: a memory for storing therein image signals respectively corresponding to the at least two kinds of images inputted thereto, a first image and a second image being included in the at least two kinds of images having a relationship in which when luminance values respectively thereof are added to each other for each pixel, a resultant image is an image not having a correlation with the first image; data allocator means for allocating, as a sequence of pulses for displaying an image corresponding to the image signal stored in the memory, a sequence of pulses having one and the same pulse width to the image signal corresponding to the first image and the image signal corresponding to the second image; and shutter control means for outputting a shutter control signal only during a period in which the sequence of pulses allocated to the image signal corresponding to the first image is outputted.

Additionally, to achieve the above exemplary object, a display device according to a fifth exemplary aspect of the present invention is a display device for sequentially displaying at least two kinds of images in a PWM drive scheme which expresses luminance grayscale by subdividing one frame into a plurality of subfields; including: a memory for storing therein image signals respectively corresponding to the at least two kinds of images inputted thereto; generating means for generating, on the basis of a first image included in the at least two kinds of images and stored in the memory, a second image having a relationship in which when luminance values of the image are added to each other for each pixel, a resultant image is an image not having a correlation with the first image; data allocator means for allocating, as a sequence of pulses for displaying an image, a sequence of pulses having one and the same pulse width to the image signal corresponding to the first image and the image signal corresponding to the second image; and shutter control means for outputting a shutter control signal only during a period in which the sequence of pulses allocated to the image signal corresponding to the first image is outputted.

In the fourth or fifth exemplary aspect of the present invention, it is favorable that the data allocator means allocates data such that the sequence of pulses of the image signal corresponding to the first image are not adjacent in time to the sequence of pulses of the image signal corresponding to the second image.

In either one of the above configurations of the fourth or fifth exemplary aspect of the present invention, it is favorable that the at least two kinds of images include a third image and the data allocator means allocates a sequence of pulses having an arbitrary pulse width to an image signal corresponding to the third image and outputs a sequence of pulses allocated to the image signal corresponding to the third image during a period in which the shutter control signal is not outputted.

In addition, to achieve the above exemplary object, a display device according a sixth exemplary aspect of the present invention is a display device for sequentially displaying three kinds of images including a first image, a second image, and a third image in a PWM drive scheme which expresses luminance grayscale by subdividing one frame into a plurality of subfields, including: a memory for storing therein image signals respectively corresponding to the three kinds of images inputted thereto, the first image and the second image having a relationship in which when luminance values thereof are added to each other for each pixel, a resultant image is an image not having a correlation with the first image; generating means for generating, on the basis of the image signal corresponding to the second image and the image signal corresponding to the third image which are stored in the memory, an image signal of a composite image thereof; data allocator means for allocating, as a sequence of pulses for displaying an image, a sequence of pulses having a pulse width to the image signal corresponding to the composite image, the pulse width being equal to a pulse width of the image signal corresponding to the first image; and shutter control means for outputting a shutter control signal only during a period in which a sequence of pulses to which the image signal corresponding to the first image is allocated is outputted.

In either one of the above configurations of the fourth, fifth, or sixth exemplary aspect of the present invention, it is favorable that the data allocator means allocates a blanking period at least before or after the period in which the image signal corresponding to the first image is outputted.

In the sixth exemplary aspect of the present invention, it is favorable the data allocator means allocates data for the pulses which are included in the sequence of pulses of the image signal corresponding to the composite image and which have a pulse width equal to the pulse width of the image signal of the first image are not adjacent in time to the sequence of pulses corresponding to the first image.

In either one of the above configurations of the fourth, fifth, or sixth exemplary aspect of the present invention, it is favorable that an image obtained by adding luminance values of the first and second images to each other for each pixel is a gray, flat image.

Also, to achieve the exemplary object, an image display system according to a seventh exemplary aspect of the present invention employing the display device in accordance with one of the configurations of the fourth, fifth, or sixth exemplary aspect of the present invention includes an optical shutter for taking either one of a light transmission state and a light interruption state, the optical shutter being in the light transmission state when a shutter control signal is being inputted thereto.

Advantages of the Invention

In accordance with the present invention, there is provided an image processor, a display device, and an image display system capable of efficiently displaying a secret image and a public image of high picture quality without lowering contrast of the public image.

Best Mode for Carrying Out the Invention

Principle of the Invention

The gray component of the public image taking place in the related art is attributed to a summation image (an image generated to prevent person not wearing the dedicated glasses from viewing a secret image) including a reverse luminance image obtained by reversing luminance of the secret image for each color component and the secret image. Hence, to reduce the gray component to suppress bias black level in the public image, it is required to lower luminance of the secret image.

However, in the conventional method in which a secret image, its reverse image, and a public image are presented for each frame, it is not possible at presentation of the secret image to superimpose an image other than those above; therefore, the more the luminance of the secrete image is reduced, the more the light utilization efficiency is lowered.

FIG. 2 shows an example of sequential display of a secrete image, its reverse image, and a public image according to the conventional method. In FIG. 2, the abscissa indicates time and the ordinate indicates luminance. As shown here, an arbitrary period (one frame period) is subdivided into a plurality of subframes to sequentially display a secret image S, a reverse image R, and a public image P.

The reverse image R is set such that the result of an addition between the reverse image R and the secret image S for each pixel is an image not having any correlation with the secret image S. In the description below, there is employed an example of a situation in which the result of the addition between the secret image S and the reverse image R is a gray image; however, the present invention is not restricted by this example; it is also possible that the result of the addition between the secret image S and the reverse image R is a random pattern image.

By setting the reverse image such that the result of the addition between the secret image S and the reverse image R for each pixel is a gray image, the luminance integration of the image for one frame period is an integration image of the public image P and the gray image; hence, a person not wearing shutter glasses cannot recognize the secret image S, but perceives only the public image.

On the other hand, a person wearing the shutter glasses synchronized with the display period can perceive only the secret image S because light is interrupted by the shutter during the display period of the reverse image R and the public image P.

FIG. 3 shows an example in which the maximum luminance of the secret image S is reduced to half thereof in this method. By reducing the maximum luminance of the secret image S to half thereof, the maximum luminance required for the reverse image becomes also half thereof; they are reduced to 0.5 S and 0.5 R, respectively. Also, by allocating the public image to the remaining luminance component of the reverse image display period, it is possible to increase the luminance of the public image component. On the other hand, it is not possible to allocate the public image to the remaining luminance component of the secret image display period. This is because the person wearing the shutter glasses perceives the integration image of the secret image and the public image if the public image is allocated to the remaining luminance component of the secret image display period.

As above, when the luminance component of the secret image is lowered, the ratio of the remaining luminance component of the secrete image display period (the luminance component not allocatable to the public image) considerably becomes larger, which tells that the light utilization efficiency lowers.

Furthermore, in the operation in which the glasses shutter is driven synchronously with the display period of the secret image, to securely make the secret image visible, it is effective to set a (blanking) period in which the image display is not conducted if the glasses shutter is responding; however, the blanking period is arranged for each subframe in the conventional method, and the light utilization efficiency further lowers.

To cope with this situation, in a method of the present invention to suppress the gray component which is integrated for the public image without lowering the light utilization efficiency, the secret image is displayed using Pulse Width Modulation (PWM).

The drive using PWM (PWM drive) adopted as a driving method of the display device is employed in a display device of binary display for which high-speed on and off control is possible. For example, a plasma display and a display using an MEMS switch can be cited.

However, all of the displays using ordinary PWM drive are not directly applicable. This is because a pulse (pulse R) for a reverse image with a pulse width equal to that of a pulse (pulse S) of the secret image is required to be included in one frame period. If this condition is not satisfied, there occurs possibility for the person not wearing the shutter glasses to perceive the secret image.

Consider a specific example in which one frame period is subdivided into 63 to obtain a pulse sequence including subfields having widths of 16, 16, 16, 8, 4, 2, and 1 (the total of 63 subfields). To express grayscale, it is solely necessary to arbitrarily add respective pulses to each other. In this case, if a pulse sequence having a width of eight is allocated to the secret image, the remaining pulse sequences are used to express the reverse image and the public image. It is required that the reverse image is 8 if the secret image is 0 and that the reverse image is 0 if the secret image is 8; however, no pulse sequence can express 0 and 8 for the reverse image. That is, the remaining pulses cannot express the reverse image; hence, the grayscale representations of the reverse image and the public image are approximated (for example, "7" is approximated by use of pulses having widths of 4, 2, and 1). Such approximation deteriorates the picture quality of the public image, and the secrete image cannot be completely canceled by the reverse image; therefore, the secret image can be perceived also by the person not wearing the shutter glasses.

On the other hand, consider other example in which a pulse sequence with a pulse width equal to that of the pulse for the secret image is allocated to the reverse image. Similarly, one frame period is subdivided into 63 to obtain a pulse sequence including subfields having widths of 16, 16, 8, 8, 8, 4, 2, and 1. In this case, there exist three pulse sequences having a width of eight; hence, it is possible to allocate the first one thereof to the secret image, the second one to the reverse image, and the remaining one to the public image. Since the grayscale are expressed without approximating the public image, the picture quality of the public image is not deteriorated. The pulse used for the reverse image has also the width equal to that of the secret image; hence, it is possible to completely cancel the secret image, and the person not wearing the shutter glasses cannot perceive the secret image.

FIG. 4 shows a sequential display example of a secret image and a public image according to the present invention.

FIG. 4 is an example in which a secrete image (0.5S), a reverse image (0.5R), and a public image (P) are displayed using the PWM drive in a similar way as for FIG. 3. In a case using the PWM control and the binary drive, only either one of the maximum luminance (on state) and minimum luminance (off state) is possible. Also, in FIG. 4, pulses having the same pulse width exist in the period to display the secret image and the period to display the reverse image. As for the pulses of the same pulse width, if the pulse in the secret image is on, the pulse in the reverse image is off; and if the pulse in the secret image is off, the pulse in the reverse image is on.

By employing the configuration above, "the unusable and useless luminance component" present in the conventional method is removed, and the public image can be allocated to the entire remaining period.

Incidentally, as FIG. 5 shows, it is also possible that the integration value between the reverse image and the pubic image is allocated to the display periods of the reverse image and the public image. In a case in which the user wearing the shutter glasses perceives only the secret image, light is interrupted during the display periods of the reverse and public images; hence, even if these images are separately displayed (P, 0.5R) or are displayed as an integration image (PR1, PR2), the perceived image is kept unchanged. On the other hand, for the user not wearing the shutter glasses, even if the reverse image and the public image are separately displayed, these images are integrated on his or her retina; therefore, the perceived image is one and the same regardless of whether or not the display periods are separated (PR1+PR2=P+0.5R). In this way, the perceived image is not changed regardless of whether or not the display periods of the reverse image and the public image are separated.

By applying the above method to an apparatus which will be described below, both of the secret image and the public image of high picture quality can be efficiently displayed.

First, the image processor allocates data to pulse sequences (the same pulse width for the secret image and the reverse image) corresponding to luminance values respectively of the secret image and the reverse image associated therewith and outputs the data to the display device of the PWM drive method in the subsequent stage; this makes it possible to drive the display device to display both of the secret image and the public image with a high light utilization efficiency.

Also, the display device sequentially inputs the secret image, the reverse image associated therewith, and the public image sequentially to the PWM drive circuit to allocate to the pulse sequences of the PWM drive and displays the respective images sequentially; this makes it possible to display the secret image and the public images with high picture quality and high efficiency.

Next, description will be given of exemplary embodiments of the present invention on the base of the principle above.

[First Exemplary Embodiment]

Description will be give of a first exemplary embodiment of the present invention. FIG. 6 shows a configuration of an image processor in accordance with the first exemplary embodiment. This image processor is an apparatus to execute processing on the basis of the principle of the present invention described above and includes a memory 101, a data allocator circuit 102, and a shutter glasses control signal generator circuit 103.

The memory 101 stores therein a secret image, a reverse image, and a public image which are sequentially inputted thereto. The data allocator circuit 102 allocates data such that a display device employing the PWM drive can display the secret image, the reverse image, and the public image which are sequentially outputted from the memory 101 based on a sync signal. The shutter glasses control signal generator circuit 103 controls a light transmission state and a light interruption state of a pair of shutter glasses on the basis of a sync signal inputted thereto.

Incidentally, in the drawings, the output signal from the memory 101, that from the data allocator circuit 102, and that from the shutter glasses control signal generator circuit 103 are indicated by a numeral 111, a numeral 112, and a numeral 113, respectively.

FIG. 7 is an example of a timing chart during one frame period of the output signals 111, 112, and 113. The secret image, the reverse image, and the public image stored in the memory 101 are delivered to the data allocator circuit 102. The data allocator circuit 102 allocates data of the secret image to period T1 and data of the reverse and public images to period T2.

During period T1, the display device is notified whether each pixel of the screen is an emission and light transmission state (on state) or a non-emission and light interruption state (off state) during data write period W.

Thereafter, during period S2, the emission (for a self-emission type display such as a plasma display or an organic electroluminescent display) and light transmission state (for a light control type display such as a display using an MEMS switch or a liquid-crystal display) or the non-emission and light interruption state for pixels is maintained.

Thereafter, data is again written and then the pixel on/off state is maintained during period S1 which differs in the length from period S2. Grayscale of the secret image are reproduced by use of combinations of on and off states during periods S2 and S1.

Next, during period T2, data of the reverse image and the public image is allocated through a process similar to that of the creation of the secret image (writing data and maintaining the emission and light transmission state) to reproduce grayscale of the respective images.

For the reverse image, grayscale are reproduced by use of on/off state maintaining periods R2 and R1 which are equal to S2 and S1 in the length. In this case, there exists a relationship in which for a pixel, if S2 is in an on state, R2 is an off state; and if S2 is in an off state, R2 is in an on state. This relationship also applies to S1 and R1. For the public image, grayscale are reproduced by using P4, P3, P2, and P1.

The output signal 113 to be delivered to the shutter glasses is a signal which sets the glasses to a light transmission state for period T1 and to a light interruption state for period T2. This signal is generated by the shutter glasses control signal generator circuit 103 on the basis of the sync signal of the image.

Incidentally, the data allocator circuit 102 sequentially allocates data to the secret image S, the reverse image R, and the public image P during one frame period; however, this order is an example, that is, basically, the sequence can be arbitrarily determined.

For example, as FIG. 8 shows, even if periods R2 and P2 of the case exemplified in the timing chart of FIG. 7 are exchanged with each other, the perceived image does not differ between the person wearing the shutter glasses and the person not wearing the shutter glasses (the secret image S is perceived by the person wearing the shutter glasses and the integration image of the public and gray images is perceived by the person not wearing the shutter glasses). That is, if the output signal is generated from the shutter glasses control signal generator circuit 103 such that the shutter glasses are in the light transmission state during the display period of the secret image S, the order of the secret image S, the reverse image R, and the public image P can be basically determined in an arbitrary way.

As will be described in conjunction with another exemplary embodiment later, for suppressing "moving picture false contour", the degree of arbitrariness of the order of the secret, reverse, and public images is partly restricted. However, the order is not restricted from a point of view of maximizing the light utilization efficiency.

Also, it is possible in the data allocator circuit 102 to arrange a blanking period (non-display or black display) for the shutter glasses between the secret image S and the reverse image R or between the public image P and the secret image S. When compared with the case in which the blanking period is arranged for each subframe, the blanking period is not required to be arranged between the reverse image R and the public image P, and hence the light utilization efficiency can be increased.

As above, the configuration is arranged such that the data allocator circuit 102 produces, as a signal to be employed by the display device using the PWM drive, a signal which includes in one frame period a pulse for the reverse image having the same pulse width as the secrete image, and the shutter glasses control signal generator circuit 103 generates an output signal which sets the shutter glasses to a light transmission state for the display period of the secret image S; therefore, it is possible to remove the unavailable and useless luminance component, and hence both of the secret and public images can be displayed with high picture quality and high light utilization efficiency.

[Second Exemplary Embodiment]

Description will be give of a second exemplary embodiment of the present invention. FIG. 9 shows a configuration of an image processor in accordance with the second exemplary embodiment. The image processor in accordance with the second exemplary embodiment is almost equal in structure to the first exemplary embodiment, but differs therefrom in that there is disposed a reverse image generator section 104.

The reverse image generator section 104 receives as an input thereto a secret image from the memory 101 and outputs a reverse image to the data allocator circuit 102.

The reverse image generator section 104 generates, using grayscale values of the secret image, the reverse image which cancels the secret image. Specifically, the generator section 104 obtains luminance of the reverse image so as to become luminance in "white" display of the secret image when the reverse image is added to the secret image for each pixel, and then generates a grayscale value corresponding to the luminance. In this regard, since the grayscale values of the image signals are in general produced by taking the γ characteristic of the display device into consideration and nonlinear values are assigned to the luminance, the values are converted into luminance values before the addition and then the grayscale values are restored (γ correction). If this reverse image is generated in the image processor, it is not required to store the reverse image in the memory 101, and hence the memory capacity can be reduced.

Due to the configuration above, the capacity of the expensive memory 101 can be reduced, and the advantage similar to that of the first exemplary embodiment can also be implemented.

[Third Exemplary Embodiment]

Description will be give of a third exemplary embodiment of the present invention. FIG. 10 shows a configuration of an image processor in accordance with the third exemplary embodiment. This image processor is almost equal to the first exemplary embodiment, but differs therefrom in the contents of processing in a data allocator circuit 102A. In the third exemplary embodiment, the reverse image is not clearly discriminated from the public image, but a composite image thereof is treated as one image for the data allocation.

FIG. 11 shows a timing chart including an output signal 112A from the data allocator circuit 102A of the exemplary embodiment.

The difference from the image processor according to the first exemplary embodiment (the difference with respect to the timing chart shown in FIG. 7) is that a composite image PR produced by adding the reverse image R to the public image P is displayed using periods PR4, PR3, PR2, and PR1. Here, periods PR2 and PR1 are equal to periods S2 and S1, respectively.

The values of periods PR4, PR3, PR2, and PR1 are attained by an operation of PR=R+P. For example, in a case in which the secret image can take a luminance value ranging from 0 to 3 and the composite image can take a luminance value ranging from 0 to 15, if the luminance value of the inputted secrete image is one, that of the reverse image (maximum luminance value of secret image minus luminance value of inputted secret image) is two (3 minus 1), and that of the public image is ten, the value of the composite image is PR=R+P=2+10=12.

Moreover, if the period ratio between PR4, PR3, PR2, and PR1 is 8:4:2:1 and that between S2 and S1 is 2:1; S2 is in an off state, S1 is in an on state, and PR4 is an on state, PR3 is an on state, PR2 is an off state, and PR1 is an off state.

In this fashion, the S2 and PR2 as well as S1 and PR1 of the exemplary embodiment are not always in the relationship of the exclusive on/off state, which is the case with S2 and R2 as well as S1 and R1 of the first exemplary embodiment.

Incidentally, since it is required to add the reverse image to the public image, it goes without saying that the data allocator circuit 102A includes an adder.

The other operations are similar to those of the first exemplary embodiment, and hence duplicated description will be omitted. Incidentally, since the image processor according to the exemplary embodiment is an equivalent system of the image processor according to the first exemplary embodiment, it goes without saying that a similar advantage is obtained.

As above, the data allocator circuit 102A conducts the data allocation on the basis of the composite image of the reverse and public images; and it is hence possible to reduce the number of subfields in the PWM drive.

Also, in the data allocator circuit 102A, a blanking period (non-display or black display) for the shutter glasses may be arranged between the secret image S and the composite image PR. Since no blanking period is required in the composite image PR, the light utilization efficiency can be improved.

[Fourth Exemplary Embodiment]

Description will be give of a fourth exemplary embodiment of the present invention. FIG. 12 shows a configuration of an image processor in accordance with the fourth exemplary embodiment. The image processor according to the fourth exemplary embodiment is almost equal in structure to the first exemplary embodiment, but differs therefrom in the data allocation in a data allocator circuit 102B.

FIG. 13 is a timing chart including an output signal 112B from the data allocator circuit 102B of the exemplary embodiment. The difference from the image processor according to the first exemplary embodiment (the difference with respect to the timing chart shown in FIG. 7) is that periods S2 and S1 to display the secret image and periods R2 and R1 to display the reverse image are not adjacent to each other.

A correlation exists between the secret image S and the reverse image R; for making the added image gray, S2 and R2 as well as S1 and R1 are in a relationship of an exclusive on/off state. Then, if the secret image is black or white, the reverse image is white or black. If the periods having such relationship are adjacent to each other, after an on state continues for a fixed period of time, an off state continues for a fixed period of time, or vice versa.

In a case in which an off state continues for a fixed period of time after an on state continues for a fixed period of time, if the eyes are stationary, the integration is smoothly carried out and gray is perceived; however, if the eyes are moving, the integration is not appropriately conducted, and a contour (the boundary between "white" display and "black" display) included in the secret image is perceived in some cases. This has been theoretically explained by the integration on the retina called "moving picture false contour".

That the contour of the secret image is detected in this manner indicates that the person not wearing the shutter glasses perceives although slightly the secret image, which leads to a problem. To solve the problem, it is favorable that the display period of the secret image S is not adjacent to that of the reverse image R.

Incidentally, even in a case as in the third exemplary embodiment using the composite image produced by adding the reverse image R to the public image P, it is favorable that S2 and S1 are not adjacent to periods R2 and PR1 which are equal in the length to S2 and S1. This is because S2 and PR2 as well as S1 and PR1 are in an exclusive relationship when the public image is in "black" display.

As above, since periods S2 and S1 to display the secret image are not adjacent to periods R2 and R1 to display the reverse image, the contour of the secret image is not easily detected even if the eyes is moving and more secure display can be implemented.

Incidentally, as in the respective exemplary embodiments above, it goes without saying that there is obtained an advantage to increase the light utilization efficiency.

[Fifth Exemplary Embodiment]

Description will be give of a fifth exemplary embodiment of the present invention. FIG. 14 shows a configuration of a display device in accordance with the fifth exemplary embodiment. The display device according to the fifth exemplary embodiment is a display for which the PWM drive is possible. For example, this is a plasma display, a display employing an MEMS switch, an organic electroluminescent display, or a fast response liquid-crystal display.

The display device is an apparatus to execute processing on the basis of the principle of the present invention and includes a memory 101, a shutter glasses control signal generator circuit 103, a display controller 105, and a display section 106.

The memory 101 stores therein a secret image, a reverse image, and a public image which are sequentially inputted thereto. The display controller 105 allocates data such that a display device employing the PWM drive can display the secret image, the reverse image, and the public image which are sequentially outputted from the memory 101 based on a sync signal and then generates a control signal and an image signal to drive the display device. The shutter glasses control signal generator circuit 103 controls a light transmission state and a light interruption state of a pair of shutter glasses on the basis of the sync signal inputted thereto.

As in the exemplary embodiment, by assigning the function of the data allocator circuit 102 of the first exemplary embodiment to the display controller, it is possible to make the display device execute the data allocation processing.

As above, the display device in accordance with the present invention is capable of displaying the secret and public images with high picture quality and high efficiency.

The example here is a configuration in which the data allocator circuit of the image processor in accordance with the first exemplary embodiment is replaced by the display controller and the display section is arranged as a stage following the display controller; however, the data allocator circuit of the image processor in accordance with the second, third, or fourth exemplary embodiment may naturally be replaced by the display controller.

Furthermore, although the example here is a case of executing the present invention as a display device, it is naturally possible to execute the present invention as an image display system including a display device and shutter glasses.

Incidentally, each of the exemplary embodiments is an example of a favorable exemplary embodiment of the present invention, and the present invention is not limited to these exemplary embodiments.

For example, the example of the exemplary embodiments is a case of application of a monochrome image; however, it is also possible, by disposing a configuration similar to that of the above exemplary embodiments for each RGB signal component, to apply the present invention to an image processor and a display device for color images.

However, the raster image need not be color signals including image signals of a plurality of colors, but may be a monochrome image. That is, it is not necessarily required that the configuration shown in the above exemplary embodiments is arranged for each color in a parallel fashion.

Moreover, although description has been given of an example of a configuration in which the shutter glasses are adopted to perceive the secret image, the configuration is not necessarily restricted by the glasses. Any configuration may be possible only if a shutter is arranged between the display section and the eyes.

Also, if the secret image is not displayed, the pulse sequence allocated to the secret image may be utilized to display the public image. By disposing such changeover means, the secret image can be displayed only if the image is required; hence, the light utilization efficiency can be maximized.

As above, various variations are possible for the present invention.

This application is based upon and claims the benefit of priority from Japanese patent application No. 2006-211169, filed on Aug. 2, 2006, the disclosure of which is incorporated herein in its entirety by reference.

BRIEF DESCRIPTION OF DRAWINGS

[FIG. 9] is a diagram showing a configuration of an image processor according to a second exemplary embodiment of the present invention;

[FIG. 12] is a diagram showing a configuration of an image processor according to a fourth exemplary embodiment of the present invention;

[FIG. 14] is a diagram showing a configuration of a display device according to a fifth exemplary embodiment of the present invention.

DESCRIPTION OF REFERENCE NUMERALS

Figure 1:
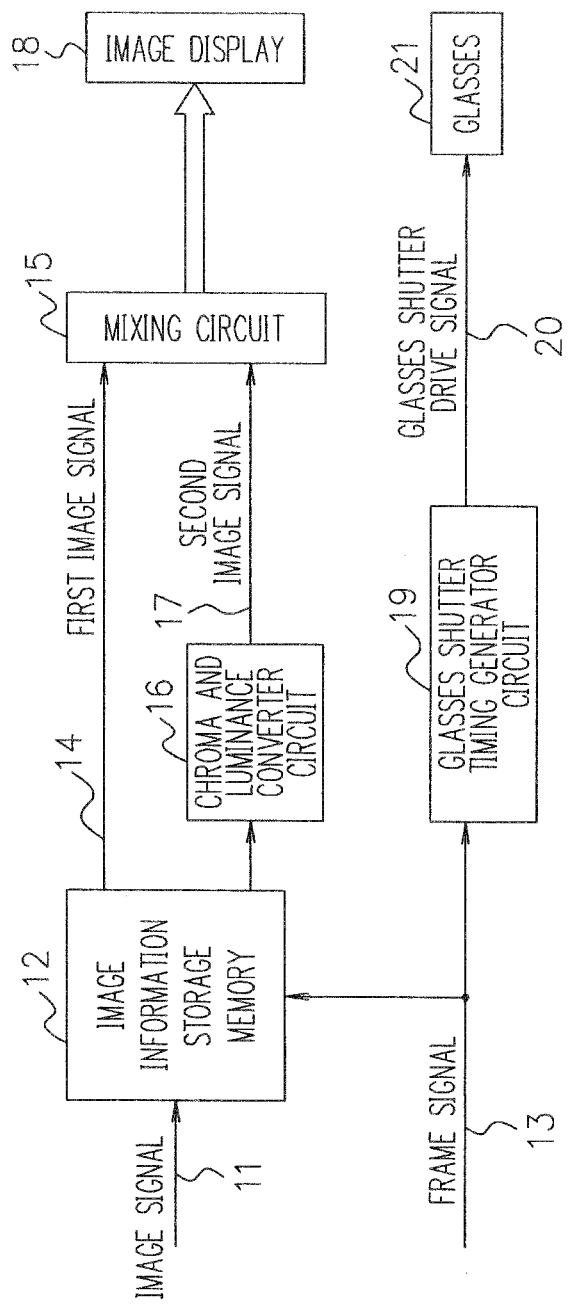
[FIG. 1] is a diagram showing a configuration of the conventional display device employing a pair of shutter glasses.
Figure 2:
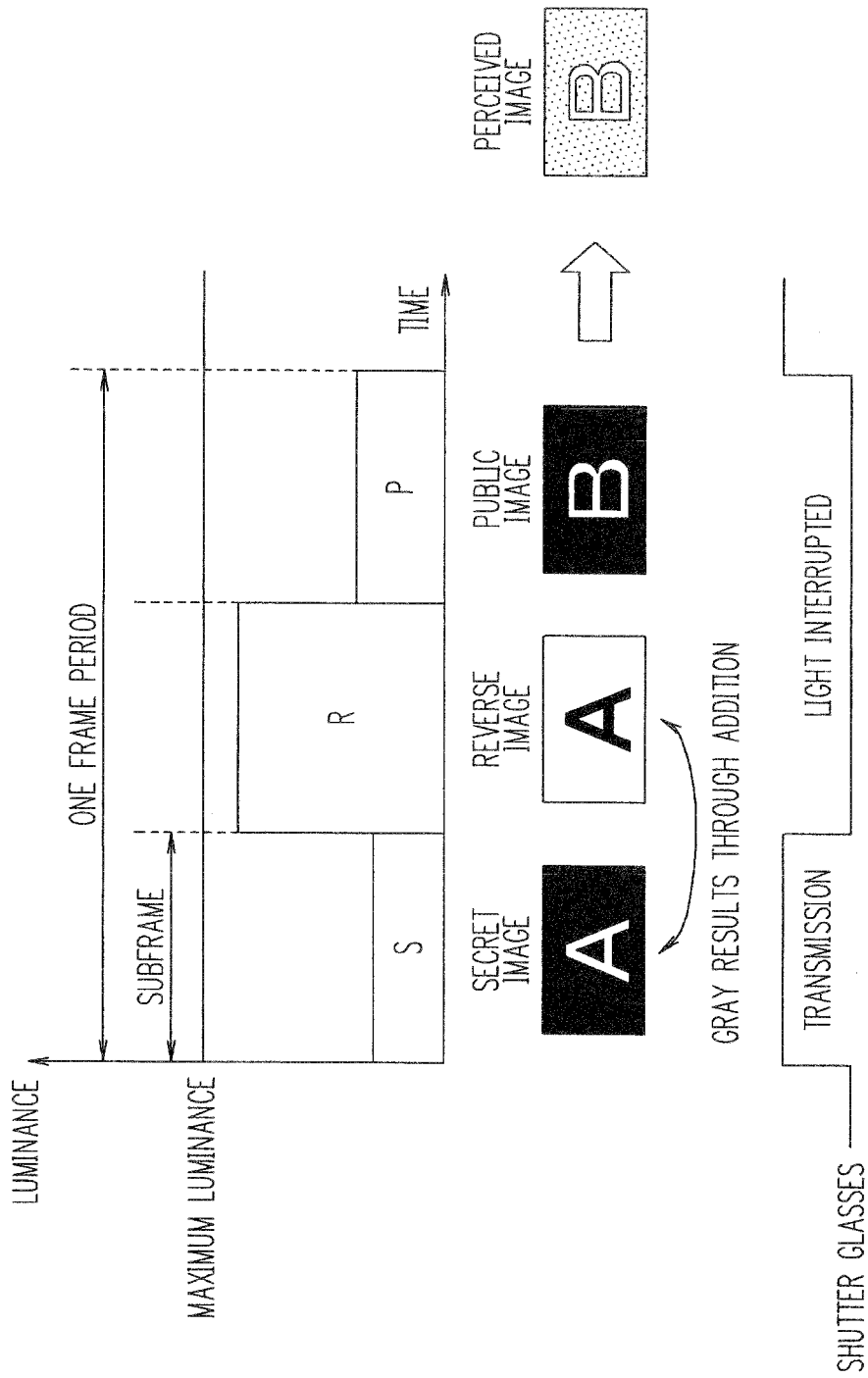
[FIG. 2] is a diagram showing a display example in a case wherein a secret image, a reverse image, and a public image are sequentially displayed during one frame period.
Figure 3:
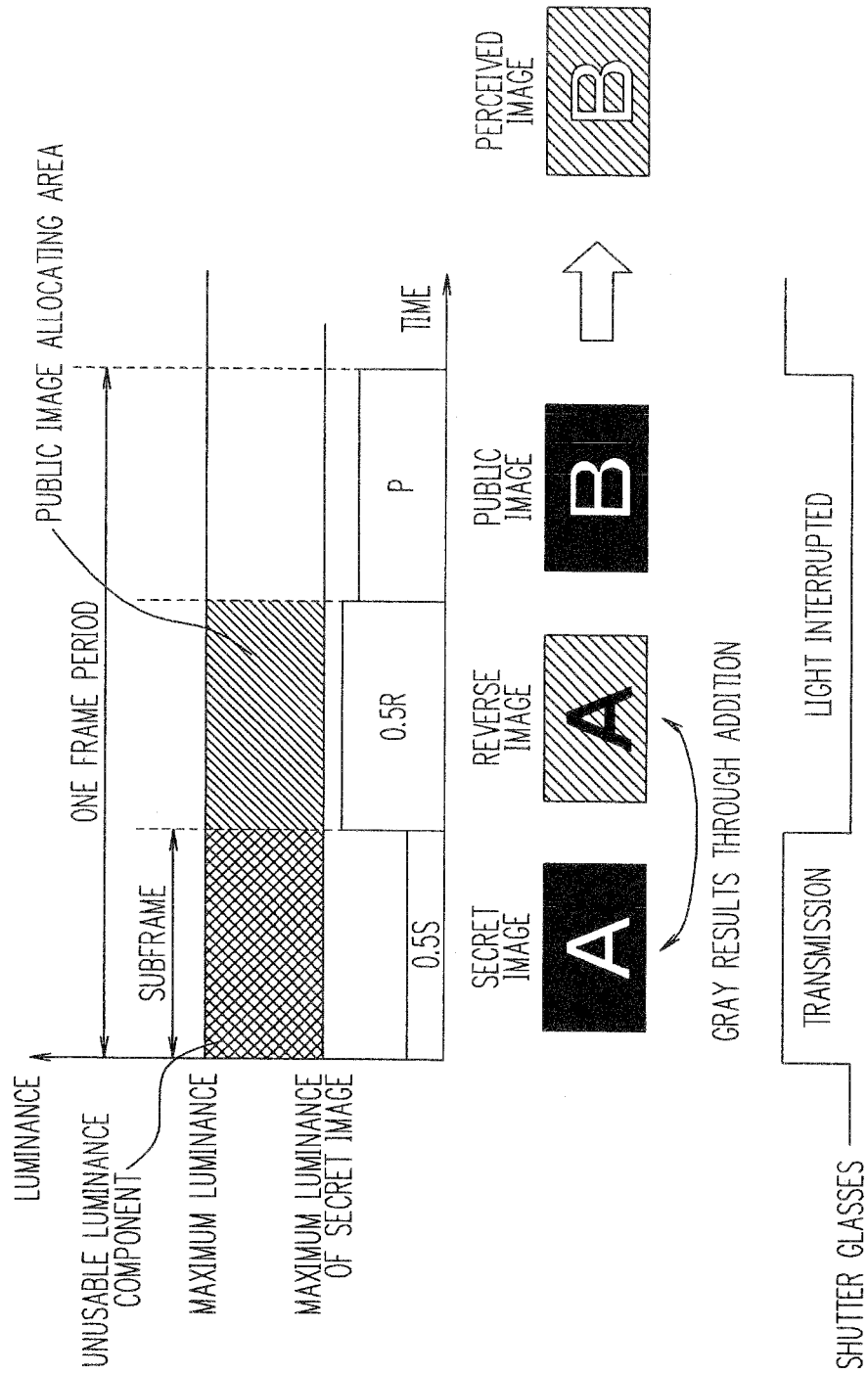
[FIG. 3] is a diagram showing a display example in a case wherein a secret image, a reverse image, and a public image are sequentially displayed during one frame period.
Figure 4:
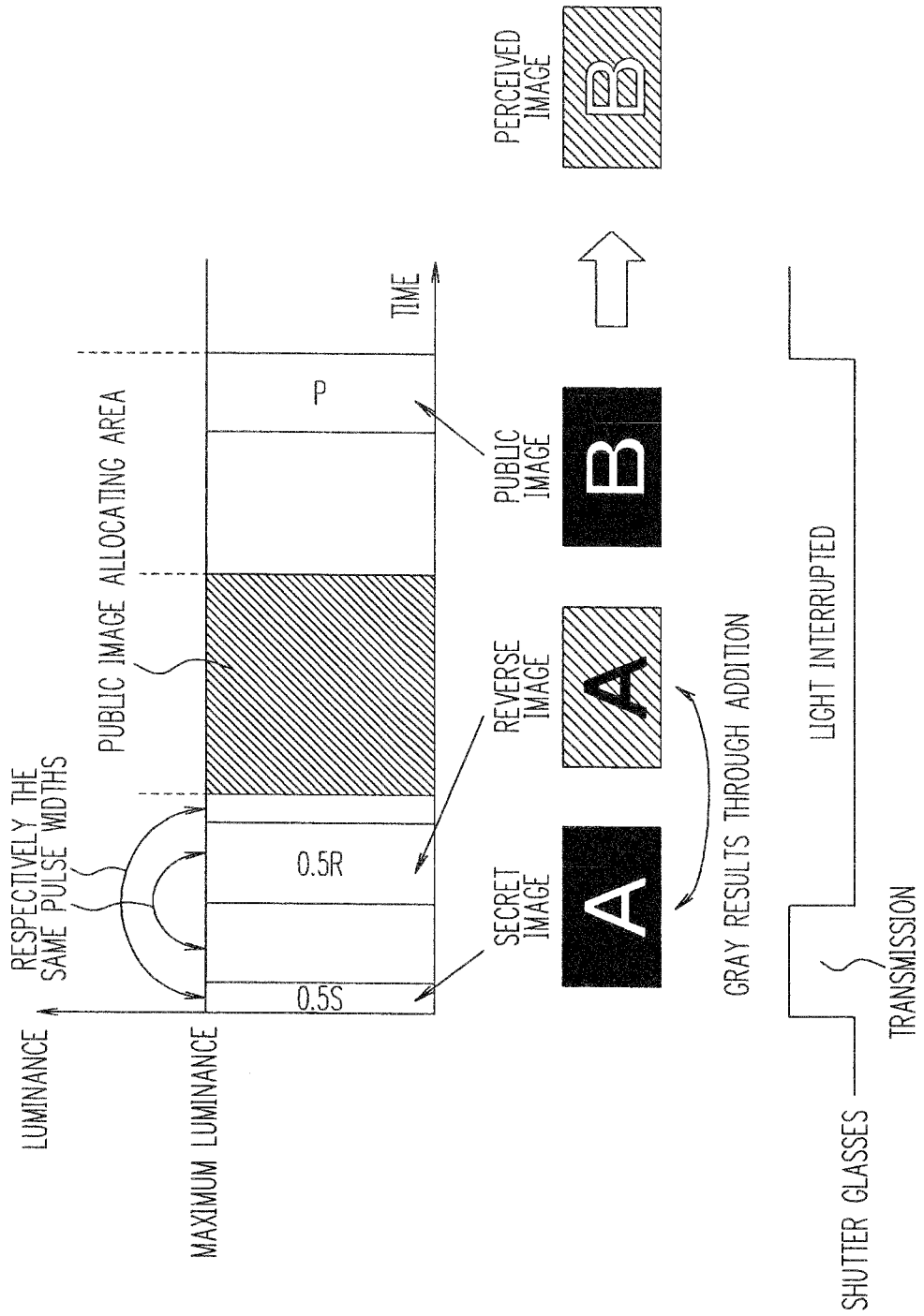
[FIG. 4] is a diagram showing a display example in a case wherein a secret image, a reverse image, and a public image are sequentially displayed on a display device of PWM drive scheme.
Figure 5:
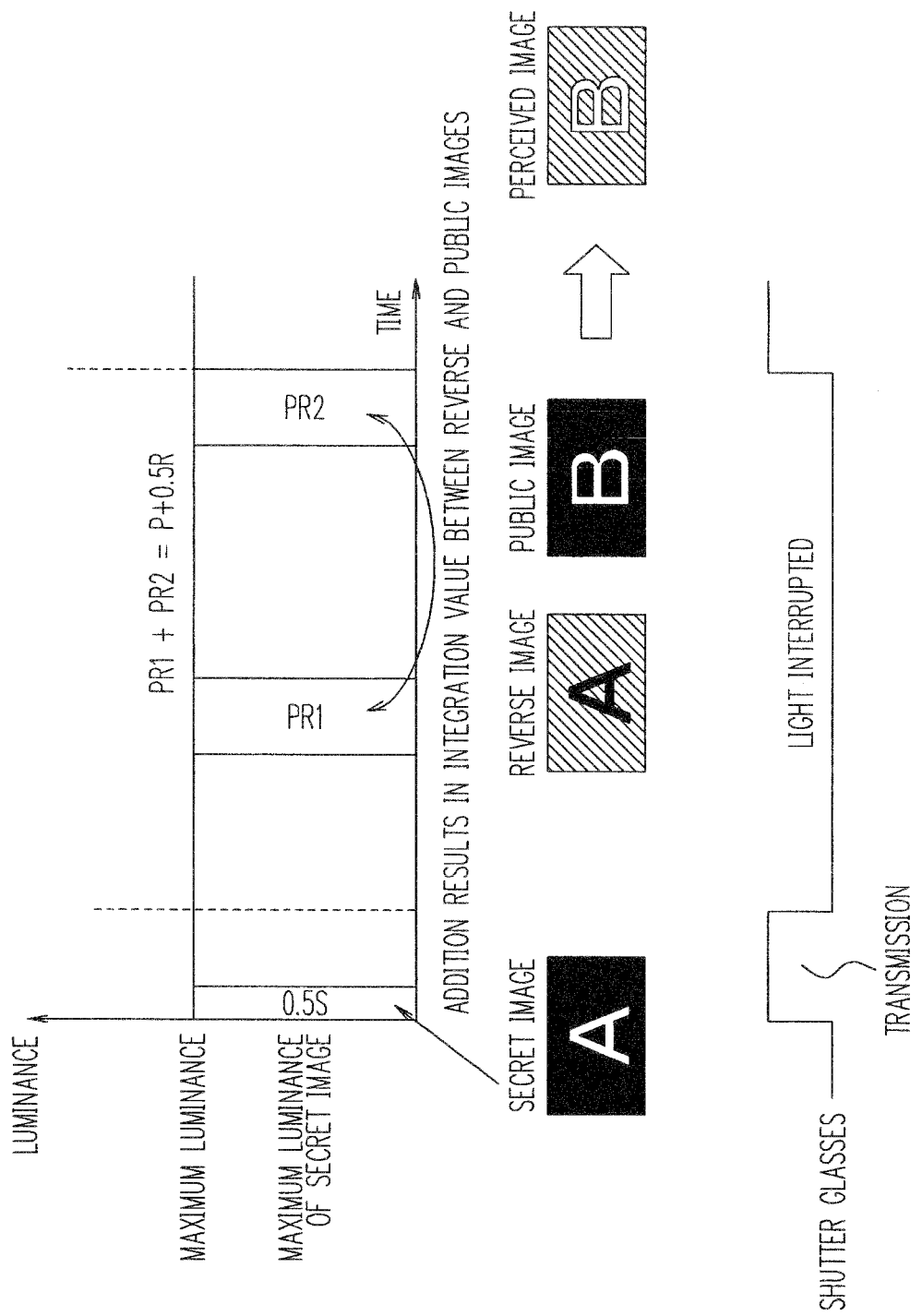
[FIG. 5] is a diagram showing a display example in a case wherein a secret image, a reverse image, and a public image are sequentially displayed on a display device of PWM drive scheme.
Figure 6:
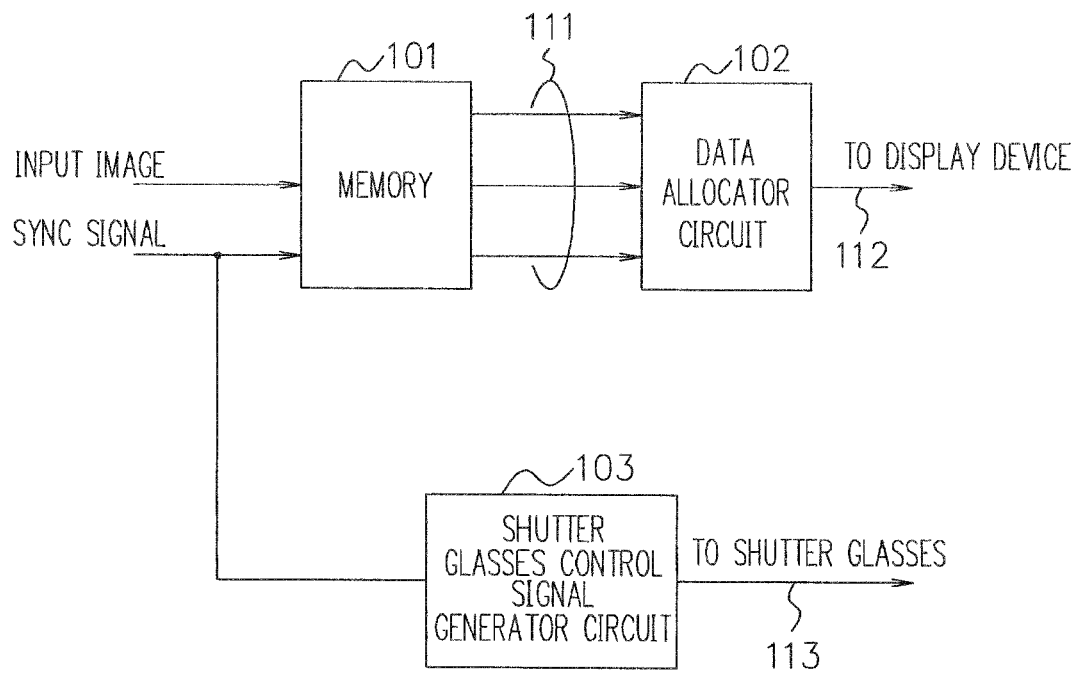
[FIG. 6] is a diagram showing a configuration of an image processor according to a first exemplary embodiment of present invention.
Figure 7:
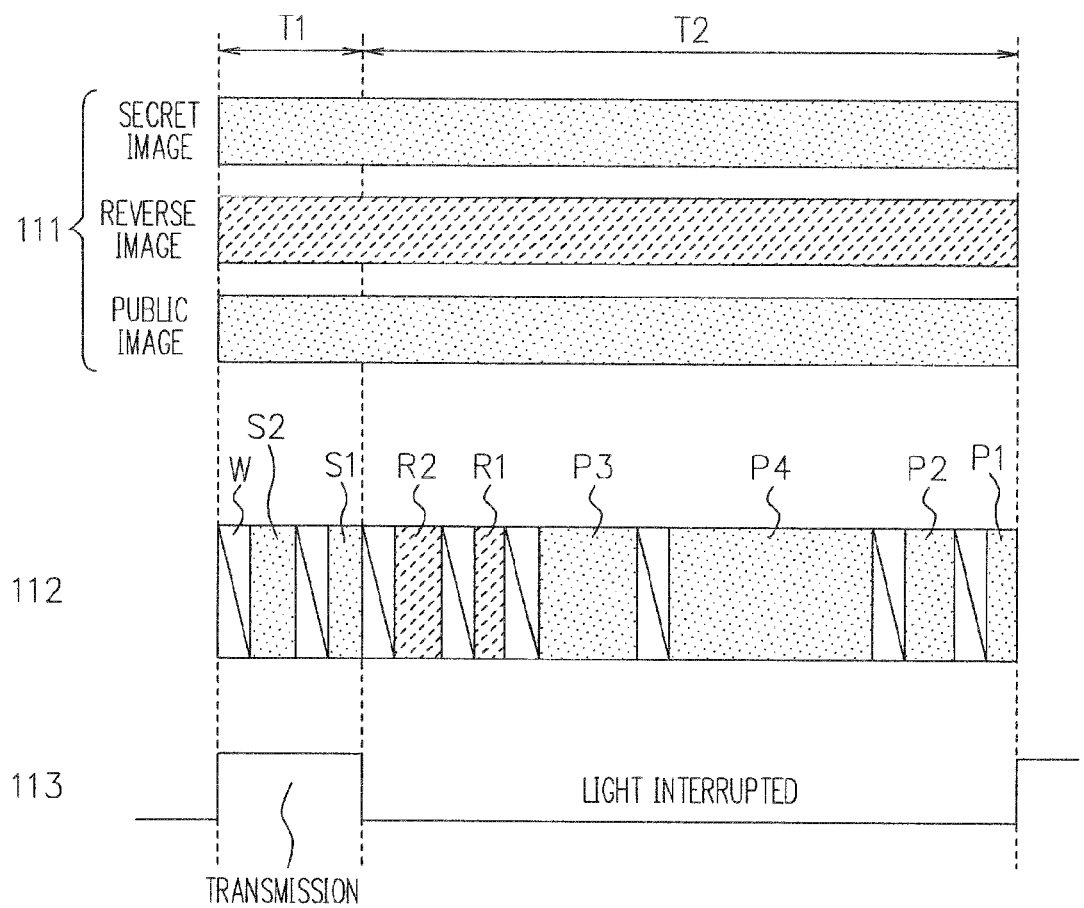
[FIG. 7] is a diagram showing an example of allocation of pulse sequences to a secret image, a reverse image, and a public image in the image processor according to the first exemplary embodiment.
Figure 8:
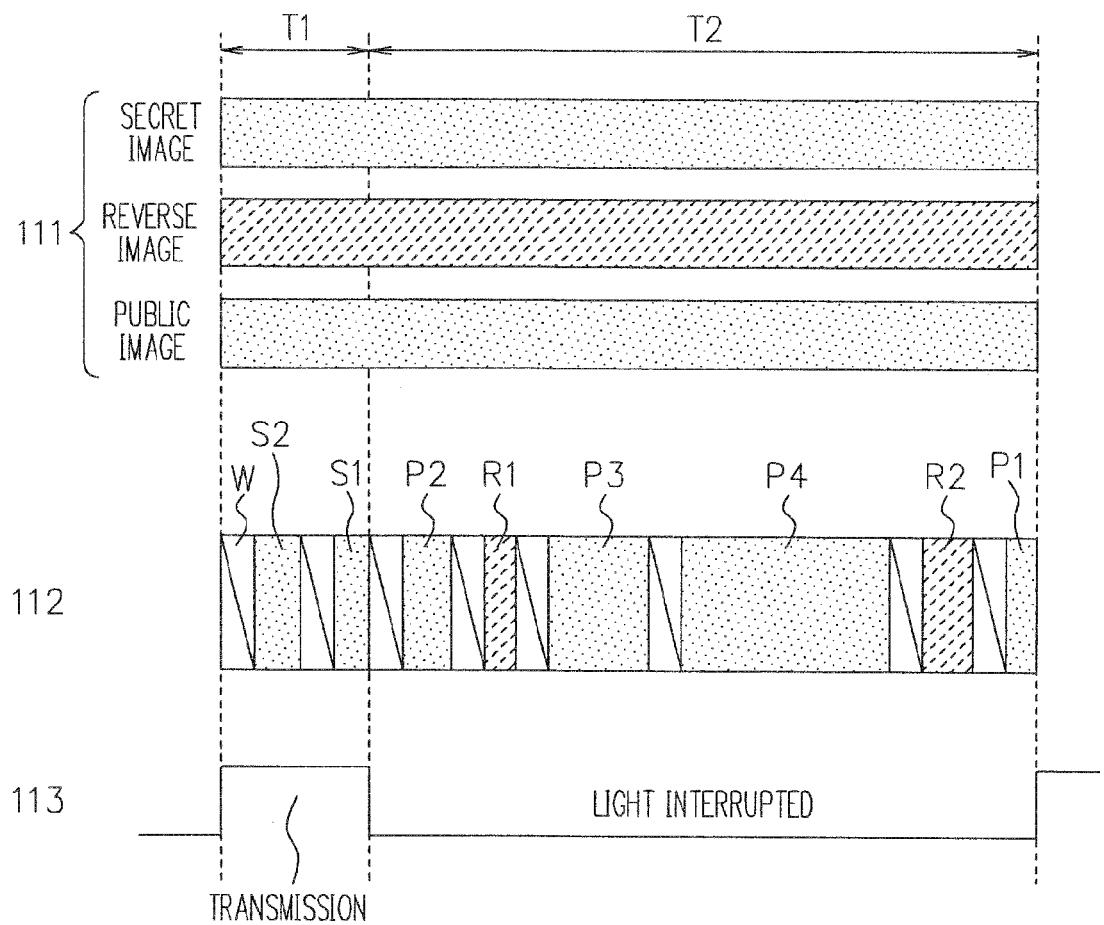
[FIG. 8] is a diagram showing another example of allocation of pulse sequences to a secret image, a reverse image, and a public image in the image processor according to the first exemplary embodiment.
Figure 10:
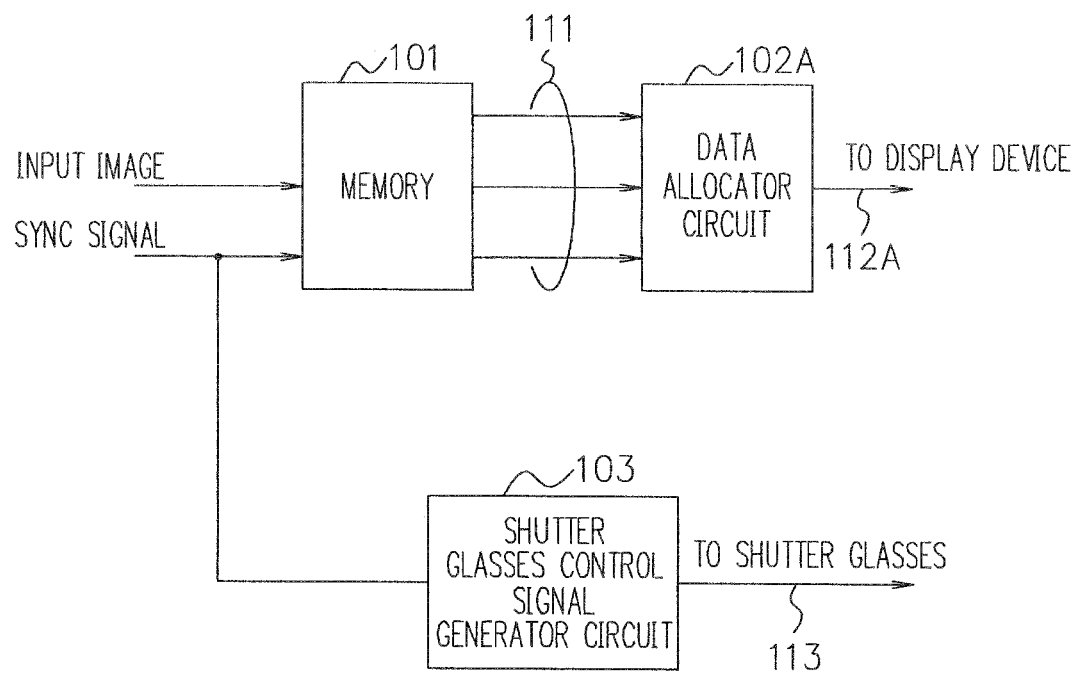
[FIG. 10] is a diagram showing a configuration of an image processor according to a third exemplary embodiment of the present invention.
Figure 11:
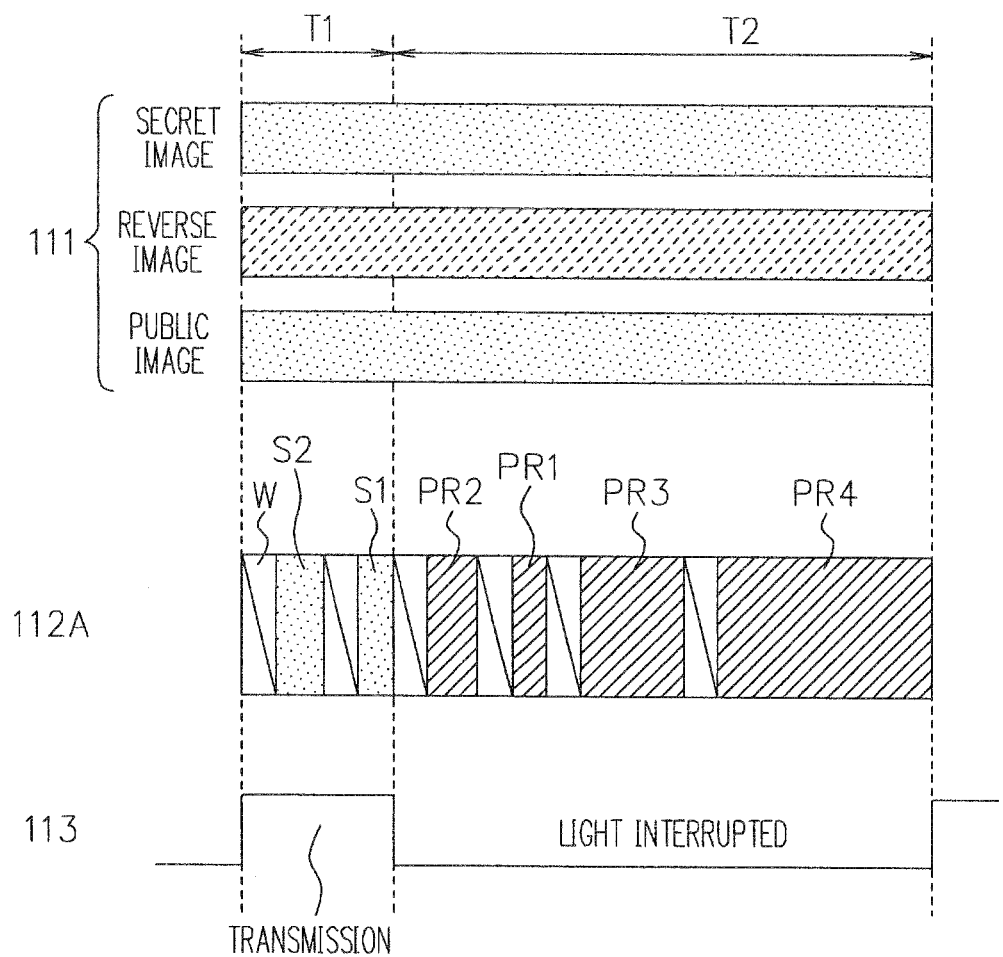
[FIG. 11] is a diagram showing an example of allocation of pulse sequences to a composite image between a reverse image and a secret image and to a public image in the image processor according to the third exemplary embodiment.
Figure 13:
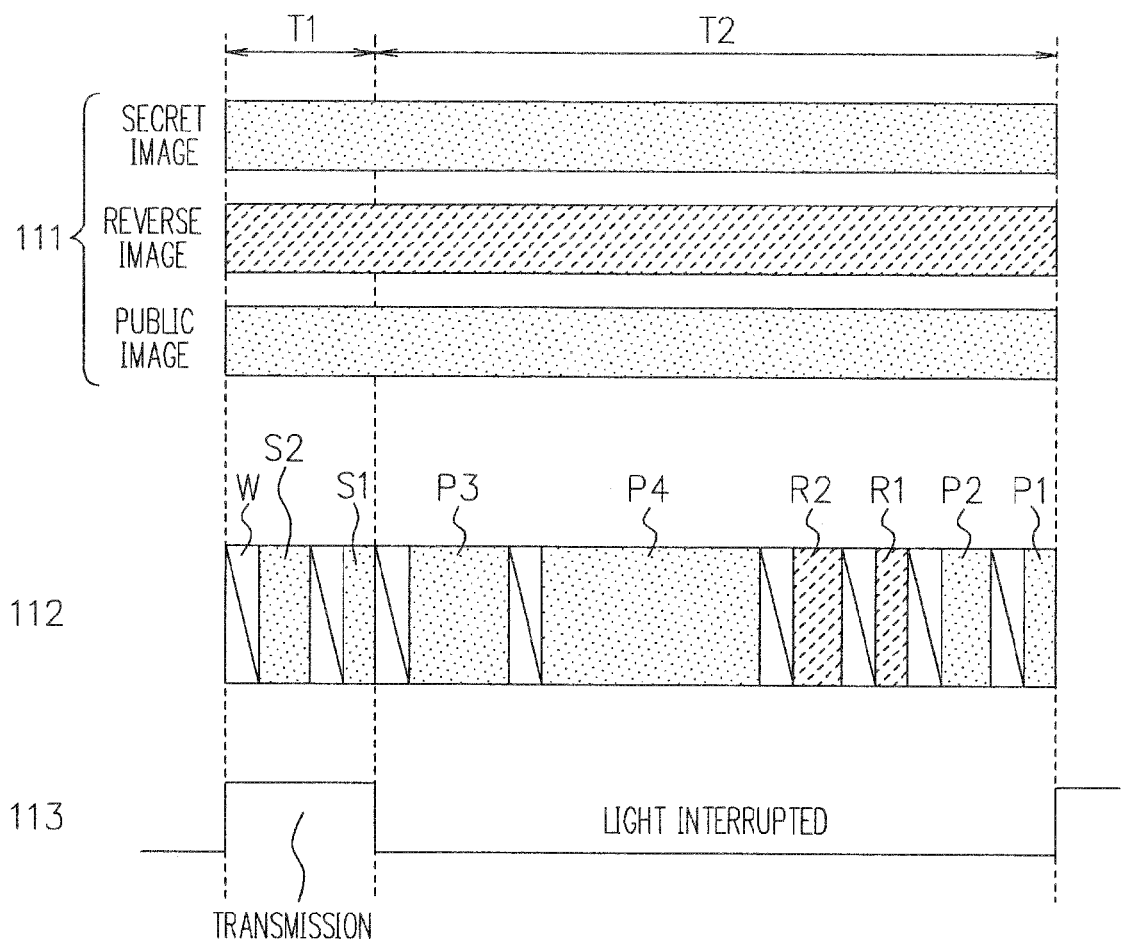
[FIG. 13] is a diagram showing an example of allocation of pulse sequences to a secret image, a reverse image, and a public image in the image processor according to the fourth exemplary embodiment.

101 Memory
102, 102A, 102B Data allocator circuit
103 Shutter glasses control signal generator circuit
104 Reverse image generator section
105 Display controller
106 Display section
111 Memory output signal
112 Data allocator circuit output signal
113 Shutter glasses control signal generator circuit output signal

The invention claimed is:

1. An image processor for sequentially outputting image signals respectively corresponding to at least two kinds of images, comprising:

a memory storing image data respectively of the at least two kinds of images inputted thereto, the at least two kinds of images including a first image and a second image, wherein each of the image signals includes a sequence of pulses for displaying an image corresponding to image data on a display device of a PWM drive scheme expressing luminance grayscale by subdividing one frame into a plurality of subfields, the first and second images having a relationship in which when luminance values of the image data are added to each other for each pixel, resultant image data is image data of a third image not having a correlation with the first image;

a data allocator unit allocating, on the basis of the image data of the at least two kinds of images stored in the memory, a said sequence of pulses including the image data of the first image to each of the subfields so that a period for displaying the first image is shorter than one-third of one frame period, and allocating another said sequence of pulses including the image data of the second image whose pulse width is the same as that of the image data of the first image to each of the subfields in order to be included in a remaining period of the one-third of the one frame period, wherein periods for displaying the first and second images are a same length and wherein a remainder of the one frame period is allocated to data write periods, to the third image, and to optional blanking periods; and a shutter control unit outputting a shutter control signal for shutter glasses only during a period in which the image signal corresponding to the first image is outputted so that the first image is seen through the shutter glasses.

2. An image processor for sequentially outputting image signals respectively corresponding to at least two kinds of images, comprising:

a memory storing image data respectively of the at least two kinds of images inputted thereto, wherein each of the image signals includes a sequence of pulses for displaying an image corresponding to image data on a display device of a PWM drive scheme expressing luminance grayscale by subdividing one frame into a plurality of subfields;

a generating unit which generates, on the basis of image data of a first image included in the at least two kinds of images and stored in the memory, image data of a second image, the first and second images having a relationship in which when luminance values of the image data are added to each other for each pixel, resultant image data is image data of a third image not having a correlation with the first image;

a data allocator unit allocating a said sequence of pulses including the image data of the first image to each of the subfields so that a period for displaying the first image is shorter than one-third of one frame period, and allocating another sequence of pulses including the image data of the second image whose pulse width is the same as that of the image data of the first image to each of the subfields in order to be included in a remaining period of the one-third of the one frame period, wherein periods for displaying the first and second images are a same length and wherein a remainder of the one frame period is allocated to data write periods, to the third image, and to optional blanking periods; and a shutter control unit outputting a shutter control signal for shutter glasses only during a period in which the image signal corresponding to the first image is outputted so that the first image is seen through the shutter glasses.

3. The image processor in accordance with claim 1, wherein the data allocator unit allocates data such that the image signal corresponding to the first image is not adjacent in time to the image signal corresponding to the second image.

4. The image processor in accordance with claim 1, wherein the data allocator unit allocates a sequence of pulses having an arbitrary pulse width to image data of the third image and outputs an image signal corresponding to the third image during a period in which the shutter control signal is not outputted.

5. An image processor for sequentially outputting image signals respectively corresponding to three kinds of images including a first image, a second image, and a third image, comprising:

a memory storing therein image data respectively of the three kinds of images inputted thereto, the first image and the second image having a relationship in which when luminance values of image data are added to each other for each pixel, resultant image data is image data of the third image not having a correlation with the first image, wherein each of the image signals includes a sequence of pulses for displaying an image corresponding to image data on a display device of a PWM drive scheme expressing luminance grayscale by subdividing one frame into a plurality of subfields;

a generating unit which generates, on the basis of the image data of the second image and the image data of the third image which are stored in the memory, image data of a composite image thereof;

a data allocator unit allocating a said sequence of pulses including the image data of the first image to each of the subfields so that a period for displaying the first image is shorter than one-third of one frame period, and allocating another said sequence of pulses including the image data of the composite image whose pulse width is the same as that of the image data of the first image to each of the subfields in order to be included in a remaining period of the one-third of the one frame period, wherein a remainder of the one frame period is allocated to data write periods, to the composite image, and to optional blanking periods; and a shutter control unit outputting a shutter control signal for shutter glasses only during a period in which the image signal corresponding to the first image is outputted so that the first image is seen through the shutter glasses.

6. The image processor in accordance with claim 5, wherein the data allocator unit allocates data such that pulses which are included in the sequence of pulses of the image signal corresponding to the composite image and which have a pulse width equal to the pulse width of the image signal of the first image are not adjacent in time to the image signal corresponding to the first image.

7. The image processor in accordance with claim 1, wherein the data allocator unit allocates a blanking period at least before or after the period in which the image signal corresponding to the first image is outputted.

8. The image processor in accordance with claim 1, wherein an image obtained by adding luminance values of the image data respectively of the first and second images to each other for each pixel is a gray, flat image.

9. A display device for sequentially displaying at least two kinds of images, comprising:

the display device being arranged to sequentially display the at least two kinds of images in a PWM drive scheme which expresses luminance grayscale by subdividing one frame into a plurality of subfields;

a memory storing therein image signals respectively corresponding to the at least two kinds of images inputted thereto, the at least two kinds of images including a first image and a second image having a relationship in which when luminance values are added to each other for each pixel, a resultant image is a third image not having a correlation with the first image;

a data allocator unit allocating, on the basis of the image signals of the at least two kinds of images stored in the memory, a sequence of pulses including the image signal corresponding to the first image to each of the subfields so that a period for displaying the first image is shorter than one-third of one frame period, and allocating another sequence of pulses including the image signal corresponding to the second image whose pulse width is the same as that of the image signal corresponding to the first image to each of the subfields in order to be included in a remaining period of the one-third of the one frame period, wherein periods for displaying the first and second images are a same length and wherein a remainder of the one frame period is allocated to data write periods, to the third image, and to optional blanking periods; and a shutter control unit outputting a shutter control signal for shutter glasses only during a period in which the sequence of pulses allocated to the image signal corresponding to the first image is outputted so that the first image is seen by the shutter glasses.

10. A display device for sequentially displaying at least two kinds of images, comprising:

the display device being arranged to sequentially display the at least two kinds of images in a PWM drive scheme which expresses luminance grayscale by subdividing one frame into a plurality of subfields;

a memory storing image signals respectively corresponding to the at least two kinds of images inputted thereto;

a generating unit which generates, on the basis of a first image included in the at least two kinds of images and stored in the memory, a second image having a relationship with the first image in which when luminance values of the image are added to each other for each pixel, a resultant image is a third image not having a correlation with the first image;

a data allocator unit allocating a sequence of pulses including the image signal corresponding to the first image to each of the subfields so that a period for displaying the first image is shorter than one-third of one frame period, and allocating another sequence of pulses including the image signal corresponding to the second image whose pulse width is the same as that of the image signal corresponding to the first image to each of the subfields in order to be included in a remaining period of the one-third of the one frame period, wherein periods for displaying the first and second images are a same length and wherein a remainder of the one frame period is allocated to data write periods, to the third image, and to optional blanking periods; and a shutter control unit outputting a shutter control signal for shutter glasses only during a period in which the sequence of pulses allocated to the image signal corresponding to the first image is outputted so that the first image is seen by the shutter glasses.

11. The display device in accordance with claim 9, wherein the data allocator unit allocates data such that the sequence of pulses of the image signal corresponding to the first image are not adjacent in time to the sequence of pulses of the image signal corresponding to the second image.

12. The display device in accordance with claim 9, wherein the data allocator unit allocates a sequence of pulses having an arbitrary pulse width to an image signal corresponding to the third image and outputs a sequence of pulses allocated to the image signal corresponding to the third image during a period in which the shutter control signal is not outputted.

13. A display device for sequentially displaying three kinds of images including a first image, a second image, and a third image, comprising:

the display device being arranged to sequentially display the three kinds of images in a PWM drive scheme which expresses luminance grayscale by subdividing one frame into a plurality of subfields;

a memory storing therein image signals respectively corresponding to the three kinds of images inputted thereto, the first image and the second image having a relationship in which when luminance values thereof are added to each other for each pixel, a resultant image is the third image not having a correlation with the first image;

a generating unit which generates, on the basis of the image signal corresponding to the second image and the image signal corresponding to the third image which are stored in the memory, an image signal of a composite image thereof;

a data allocator unit allocating a sequence of pulses including image data of the first image to each of the subfields so that a period for displaying the first image is shorter than one-third of one frame period, and allocating another sequence of pulses including image data of the composite image whose pulse width is the same as that of the image data of the first image to each of the subfields in order to be included in a remaining period of the one frame period, wherein periods for displaying the first and composite images are a same length and wherein a remainder of the one frame period is allocated to data write periods, to the composite image, and to optional blanking periods; and shutter control unit outputting a shutter control signal for shutter glasses only during a period in which the sequence of pulses to which the image signal corresponding to the first image is allocated is outputted so that the first image is seen by the shutter glasses.

14. The display device in accordance with claim 13, wherein the data allocator unit allocates data such that pulses which are included in the sequence of pulses of the image signal corresponding to the composite image and which have a pulse width equal to the pulse width of the image signal of the first image are not adjacent in time to the sequence of pulses corresponding to the first image.

15. The display device in accordance with claim 9, wherein the data allocator unit allocates a blanking period at least before or after the period in which the image signal corresponding to the first image is outputted.

16. The display device in accordance with claim 9, wherein an image obtained by adding luminance values of the first and second images to each other for each pixel is a gray, flat image.

17. The image display system employing the display device in accordance with claim 9, comprising:

an optical shutter for taking either one of a light transmission state and a light interruption state, the optical shutter being in the light transmission state when a shutter control signal is being inputted thereto.

18. The image processor in accordance with claim 2, wherein the data allocator unit allocates data such that the image signal corresponding to the first image is not adjacent in time to the image signal corresponding to the second image.

19. The image processor in accordance with claim 2, wherein the data allocator unit allocates a sequence of pulses having an arbitrary pulse width to image data of the third image and outputs an image signal corresponding to the third image during a period in which the shutter control signal is not outputted.

20. The image processor in accordance with claim 2, wherein the data allocator unit allocates a blanking period at least before or after the period in which the image signal corresponding to the first image is outputted.

21. The image processor in accordance with claim 5, wherein the data allocator unit allocates a blanking period at least before or after the period in which the image signal corresponding to the first image is outputted.

22. The image processor in accordance with claim 2, wherein an image obtained by adding luminance values of the image data respectively of the first and second images to each other for each pixel is a gray, flat image.

23. The image processor in accordance with claim 5, wherein an image obtained by adding luminance values of the image data respectively of the first and second images to each other for each pixel is a gray, flat image.

24. An image processor for sequentially outputting image signals respectively corresponding to at least two kinds of images comprising:
 a memory storing image data respectively of the at least two kinds of images inputted thereto, the at least two kinds of images including a first image and a second image, the first and second images having a relationship in which when luminance values of the image data are added to each other for each pixel, resultant image data is image data of a third image not having a correlation with the first image, wherein each of the image signals includes a sequence of pulses for displaying an image corresponding to image data on a display device of a PWM drive scheme expressing luminance grayscale by subdividing one frame into a plurality of subfields;
 data allocator means for allocating, on the basis of the image data of the at least two kinds of images stored in the memory a said sequence of pulses including the image data of the first image to each of the subfields so that a period for displaying the first image is shorter than one-third of one frame period, and allocating another said sequence of pulses including the image data of the second image whose pulse width is the same as that of the image data of the first image, respectively stored in the memory to each of the subfields in order to be included in a remaining period of the one frame period, wherein periods for displaying the first and second images are a same length and wherein a remainder of the one frame period is allocated to data write periods, to the third image, and to optional blanking periods; and
 shutter control means for outputting a shutter control signal for shutter glasses only during a period in which the image signal corresponding to the first image is outputted so that the first image is seen by the shutter glasses.

25. An image processor for sequentially outputting image signals respectively corresponding to at least two kinds of images, comprising:
 a memory for storing therein image data respectively of the at least two kinds of images inputted thereto, wherein each of the image signals includes a sequence of pulses for displaying an image corresponding to image data on a display device of a PWM drive scheme expressing luminance grayscale by subdividing one frame into a plurality of subfields;
 generating means for generating, on the basis of image data of a first image included in the at least two kinds of images and stored in the memory, image data of a second image, the first and second images having a relationship in which when luminance values of the image data are added to each other for each pixel, resultant image data is image data of a third image not having a correlation with the first image;
 data allocator means for allocating a said sequence of pulses including the image data of the first image to each of the subfields so that a period for displaying the first image is shorter than one-third of one frame period, and allocating another said sequence of pulses including the image data of the second image whose pulse width is the same as that of the image data of the first image to each of the subfields in order to be included in a remaining period of the one-third of the one frame period, wherein periods for displaying the first and second images are a same length and wherein a remainder of the one frame period is allocated to data write periods, to the third image, and to optional blanking periods; and
 shutter control means for outputting a shutter control signal for shutter glasses only during a period in which the image signal corresponding to the first image is outputted so that the first image is seen by the shutter glasses.

26. An image processor for sequentially outputting image signals respectively corresponding to three kinds of images including a first image, a second image, and a third image, comprising:
 a memory for storing therein image data respectively of the three kinds of images inputted thereto, the first image and the second image having a relationship in which when luminance values of image data are added to each other for each pixel, resultant image data is image data of the third image not having a correlation with the first image, wherein each of the image signals includes a sequence of pulses for displaying an image corresponding to image data on a display device of a PWM drive scheme expressing luminance grayscale by subdividing one frame into a plurality of subfields;
 generating means for generating, on the basis of the image data of the second image and the image data of the third image which are stored in the memory, image data of a composite image thereof;
 data allocator means for allocating a said sequence of pulses including image data of the first image to each of the subfields so that a period for displaying the first image is shorter than one-third of one frame period, and another said sequence of pulses including the image data of the composite image whose pulse width is the same as that of the image data of the first image to each of the subfields in order to be included in a remaining period of the one-third of the one frame period, wherein periods for displaying the
 first and composite images are a same length and wherein a remainder of the one frame period is allocated to data write periods, to the composite image, and to optional blanking periods; and
 shutter control means for outputting a shutter control signal for shutter glasses only during a period in which the image signal corresponding to the first image is outputted so that the first image is seen by the shutter glasses.

27. The display device in accordance with claim 10, wherein the data allocator unit allocates data such that the sequence of pulses of the image signal corresponding to the first image are not adjacent in time to the sequence of pulses of the image signal corresponding to the second image.

28. The display device in accordance with claim 10, wherein
 the data allocator unit allocates a sequence of pulses having an arbitrary pulse width to an image signal corresponding to the third image and
 outputs a sequence of pulses allocated to the image signal corresponding to the third image during a period in which the shutter control signal is not outputted.

29. The display device in accordance with claim 10, wherein the data allocator unit allocates a blanking period at least before or after the period in which the image signal corresponding to the first image is outputted.

30. The display device in accordance with claim 13, wherein the data allocator unit allocates a blanking period at least before or after the period in which the image signal corresponding to the first image is outputted.

31. The display device in accordance with claim 10, wherein an image obtained by adding luminance values of the first and second images to each other for each pixel is a gray, flat image.

32. The display device in accordance with claim 13, wherein an image obtained by adding luminance values of the first and second images to each other for each pixel is a gray, flat image.

33. An image display system employing the display device in accordance with claim 10, wherein the shutter glasses comprise an optical shutter for taking either one of a light transmission state and a light interruption state,
   the optical shutter being in the light transmission state when a shutter control signal is being inputted thereto.

34. An image display system employing the display device in accordance with claim 13, wherein the shutter glasses comprise an optical shutter for taking either one of a light transmission state and a light interruption state, the optical shutter being in the light transmission state when a shutter control signal is being inputted thereto.

35. A display device for sequentially displaying at least two kinds of images, comprising:
   the display device being arranged to sequentially display the at least two kinds of images in a PWM drive scheme which expresses luminance grayscale by subdividing one frame into a plurality of subfields;
   a memory for storing therein image signals respectively corresponding to the at least two kinds of images inputted thereto,
   the at least two kinds of images including a first image and a second image, the first and second images having a relationship in which when luminance values are added to each other for each pixel,
   a resultant image is a third image not having a correlation with the first image;
   data allocator means for allocating a sequence of pulses including the image signal corresponding to the first image to each of the subfields so that a period for displaying the first image is shorter than one-third of one frame period, and allocating another sequence of pulses including the image signal corresponding to the second image whose pulse width is the same as that of the image signal corresponding to the first image to each of the subfields in order to be included in a remaining period of the one-third of the one frame period, wherein periods for displaying the first and second images are a same length and wherein a remainder of the one frame period is allocated to data write periods, to the third image, and to optional blanking periods; and
   shutter control means for outputting a shutter control signal for shutter glasses only during a period in which the sequence of pulses allocated to the image signal corresponding to the first image is outputted so that the first image is seen by the shutter glasses.

36. A display device for sequentially displaying at least two kinds of images, comprising:
   the display device being arranged to sequentially display the at least two kinds of images in a PWM drive scheme which expresses luminance grayscale by subdividing one frame into a plurality of subfields;
   a memory for storing therein image signals respectively corresponding to the at least two kinds of images inputted thereto;
   generating means for generating, on the basis of a first image included in the at least two kinds of images and stored in the memory, a second image, the first and second images having a relationship in which when luminance values of the image are added to each other for each pixel, a resultant image is a third image not having a correlation with the first image;
   data allocator means for allocating a sequence of pulses including the image signal corresponding to the first image to each of the subfields so that a period for displaying the first image is shorter than one-third of one frame period, and allocating another sequence of pulses including the image signal corresponding to the second image whose pulse width is that same as that of the image signal corresponding to the first image to each of the subfields in order to be included in a remaining period of the one-third of the one frame period, wherein periods for displaying the first and second images are a same length and wherein a remainder of the one frame period is allocated to data write periods, to the third image, and to optional blanking periods; and
   shutter control means for outputting a shutter control signal for shutter glasses only during a period in which the sequence of pulses allocated to the image signal corresponding to the first image is outputted so that the first image is seen by the shutter glasses.

37. A display device for sequentially displaying three kinds of images including a first image, a second image, and a third image, comprising:
   the display device being arranged to sequentially display the three kinds of images in a PWM drive scheme which expresses luminance grayscale by subdividing one frame into a plurality of subfields;
   a memory for storing therein image signals respectively corresponding to the three kinds of images inputted thereto, the first image and the second image having a relationship in which when luminance values thereof are added to each other for each pixel, a resultant image is the third image not having a correlation with the first image;
   generating means for generating, on the basis of the image signal corresponding to the second image and the image signal corresponding to the third image which are stored in the memory, an image signal of a composite image thereof;
   data allocator means for allocating a sequence of pulses including the image signal corresponding to the first image to each of the subfields so that a period for displaying the first image is shorter than one-third of one frame period, and allocating another sequence of pulses including the image signal corresponding to the composite image whose pulse width is the same as that of signal corresponding to the first image to each of the subfields in order to be included in a remaining period of the one-third of the one frame period, wherein periods for displaying the first and composite images are a same length and wherein a remainder of the one frame period is allocated to data write periods, to the composite image, and to optional blanking periods; and
   shutter control means for outputting a shutter control signal for shutter glasses only during a period in which a sequence of pulses to which the image signal corresponding to the first image is allocated is outputted so that the first image is seen by the shutter glasses.

\* \* \* \* \*

UNITED STATES PATENT AND TRADEMARK OFFICE
CERTIFICATE OF CORRECTION

PATENT NO. : 8,599,228 B2
APPLICATION NO. : 12/373943
DATED : December 3, 2013
INVENTOR(S) : Miyasaka et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 920 days.

Signed and Sealed this
Twenty-second Day of September, 2015

Michelle K. Lee
*Director of the United States Patent and Trademark Office*